United States Patent [19]
Ingram et al.

[15] 3,703,079
[45] Nov. 21, 1972

[54] HYDRAULIC ACTUATING SYSTEMS
[72] Inventors: Brian Ingram, Balsall Common; David Anthony Harries, Monkspath, Solihull, both of England
[73] Assignee: Girling Limited, Birmingham, England
[22] Filed: Sept. 11, 1970
[21] Appl. No.: 71,448

[30] Foreign Application Priority Data
Sept. 16, 1969 Great Britain..........45,562/69

[52] U.S. Cl............60/54.5 E, 60/54.6 E, 60/54.6 M
[51] Int. Cl..............................................F15b 7/00
[58] Field of Search..........60/54.5 P, 54.6 P, 54.5 A, 60/54.6 A, 54.5 M, 54.6 M, 54.5 E; 92/107

[56] References Cited
UNITED STATES PATENTS

| | | |
|---|---|---|
| 3,557,555 | 1/1971 | Wilson et al. ...............60/52 B |
| 3,180,693 | 4/1965 | Stelzer....................60/54.6 A |
| 3,478,847 | 11/1969 | Bender et al............60/54.5 E |
| 3,181,298 | 5/1965 | Alfieri....................60/54.6 M |
| 3,283,505 | 11/1966 | Julow et al. ................60/52 B |
| 2,992,533 | 7/1961 | Hodkinson.................60/52 B |
| 2,519,900 | 8/1950 | Geiger et al. ................92/108 |
| 3,473,634 | 10/1969 | Strifler et al. ...........60/54.5 E |

Primary Examiner—Martin P. Schwadron
Assistant Examiner—A. M. Zupcic
Attorney—Imirie and Smiley

[57] ABSTRACT

In an hydraulic system, a slave cylinder for operating a control member, for example a clutch lever of a vehicle, is adapted to be actuated by the supply of hydraulic fluid under pressure from a pressure space of a pedal-operated master cylinder. A valve actuated in response to the fluid pressure supply from the master cylinder is adapted to control the supply of high pressure fluid from a high pressure source to a second slave cylinder.

10 Claims, 5 Drawing Figures

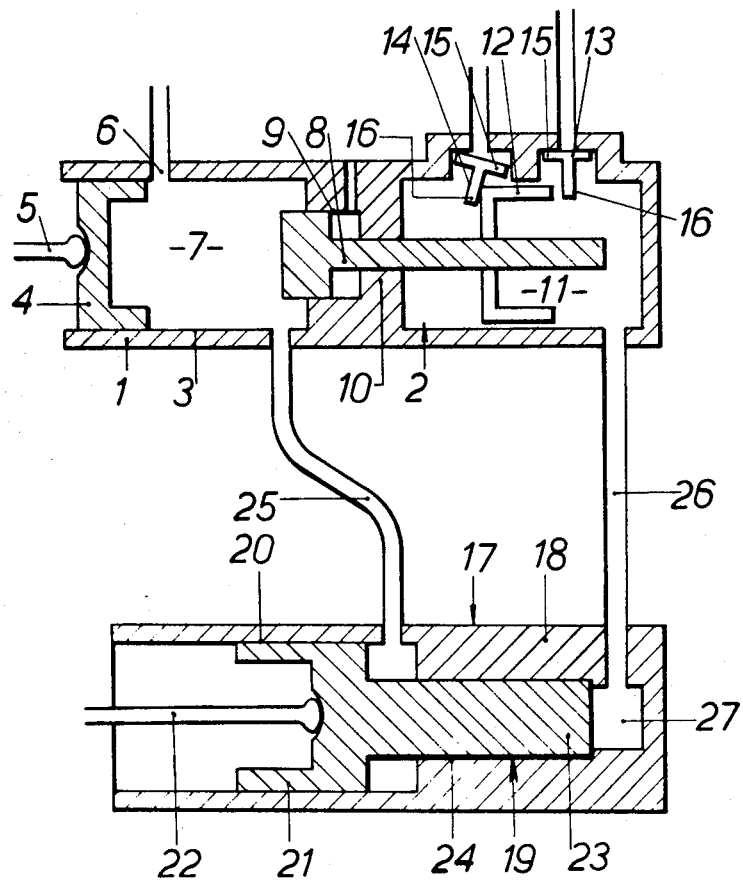

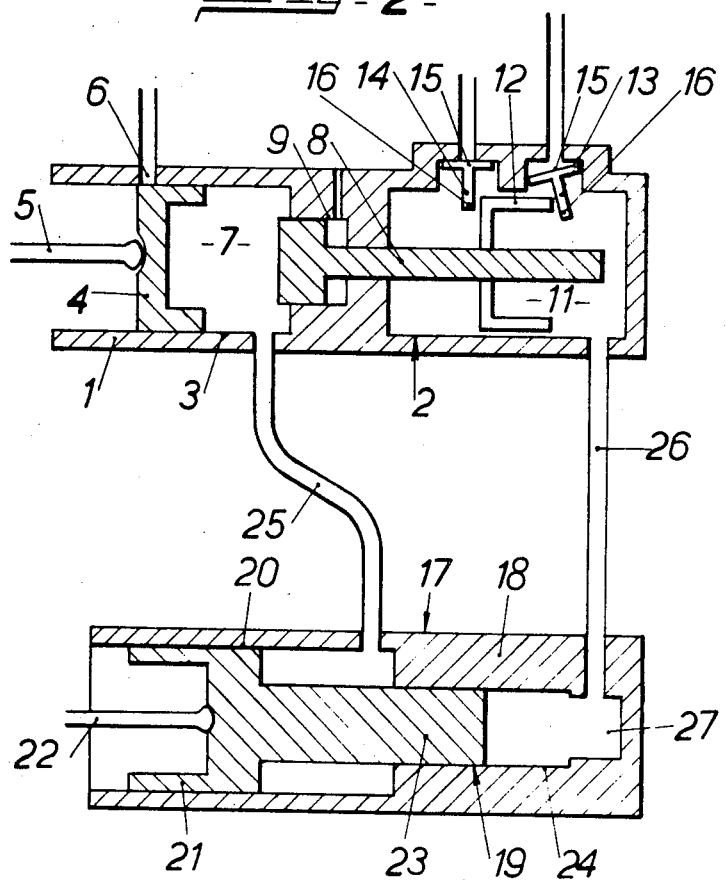
Fig-2-
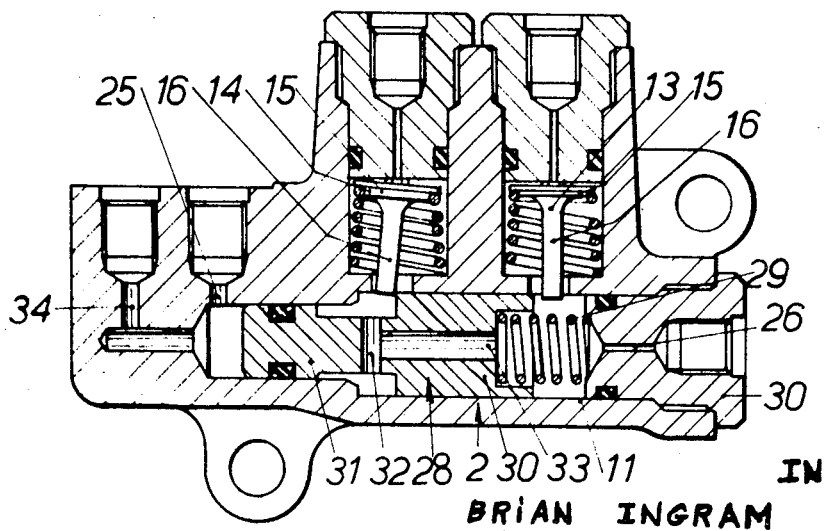
Fig-4-
INVENTORS
BRIAN INGRAM
DAVID A. HARRIES

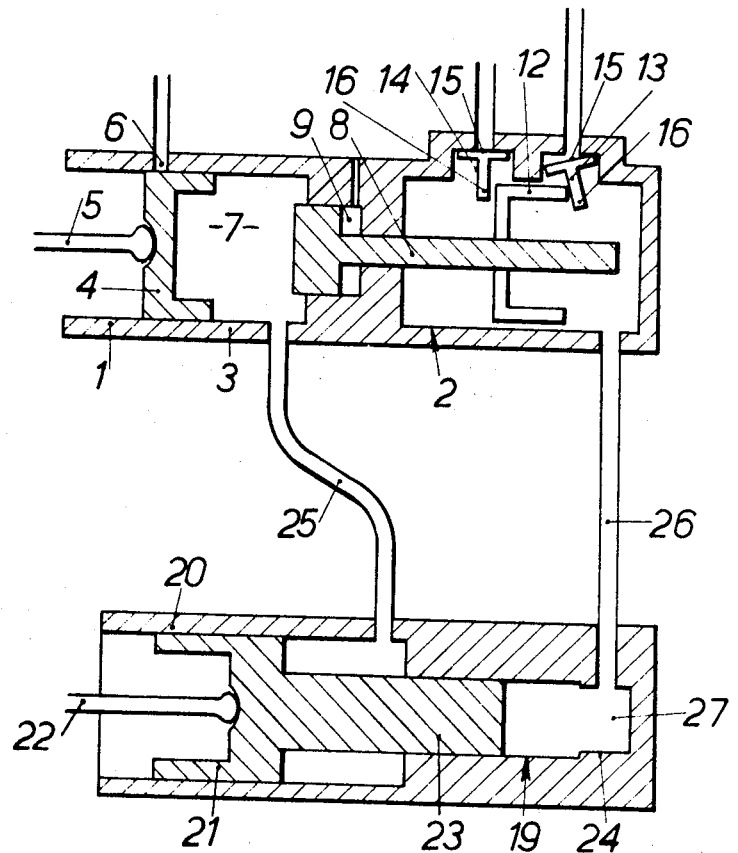
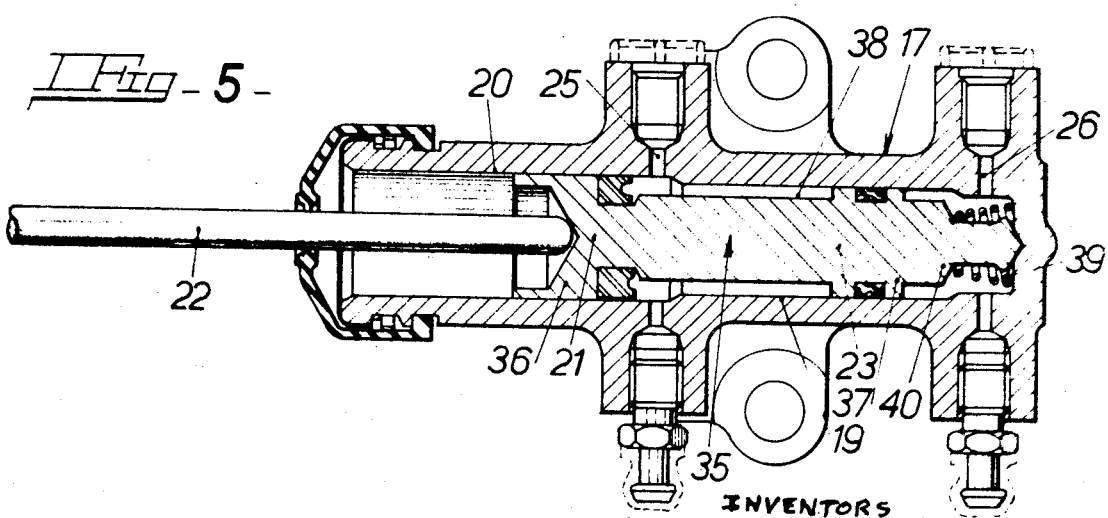

HYDRAULIC ACTUATING SYSTEMS

This invention relates to improvements in master cylinder assemblies for use in hydraulic systems of the kind for controlling the supply of fluid under pressure to a slave cylinder for operating a control member, for example a clutch lever or brake actuator.

According to our invention a master cylinder assembly for use in an hydraulic system comprises a cylinder body assembly, a positively actuated first piston assembly movable axially in a first portion of a cylinder bore in the body assembly, a secondary piston assembly movable axially in a second portion of the bore between the first piston assembly and a closed end of the second cylinder bore portion, the secondary piston assembly dividing the cylinder bore portions into first and second pressure spaces, a first outlet in a wall of the cylinder body for connecting the first pressure space to a first brake circuit, a second outlet in the wall of the cylinder body for connecting the second pressure space to a second brake circuit, a first normally closed valve for providing communication between a source of hydraulic fluid under pressure and one of the pressure spaces, a second valve for providing communication between the said one pressure space and a reservoir for the source of hydraulic fluid under pressure, said second valve normally being held in an open position by the said one piston assembly, and a third normally open valve for providing communication between the other pressure space and a reservoir for hydraulic fluid, the arrangement being such that axial movement of the positively actuated piston into the first portion of the bore subjects the first pressure space to fluid under pressure which is supplied to the first outlet and which acts simultaneously on the second piston assembly to advance it in the second bore portion to supply fluid under pressure to the second outlet.

The cylinder body assembly may comprise a single housing including the first and second bore portions. Alternatively the first and second bore portions may be provided in separate housings with the first pressure space defined by a part of the first bore portion in one housing and connected to the second bore portion of the other housing through an external connection.

Preferably the third valve provides communication between the reservoir for hydraulic fluid and the first pressure space, and the first and second valves provide communication respectively between the source of hydraulic fluid under pressure and the second pressure space, and between the second pressure space and the reservoir for the source of hydraulic fluid under pressure.

When the master cylinder assembly is incorporated in an hydraulic system a first slave cylinder is connected to the first outlet and a second slave cylinder is connected to the second outlet the arrangement being such that when the positively actuated piston assembly is advanced in the first bore portion the third valve is closed and fluid in the first pressure space is pressurized and supplied to the first slave cylinder, the pressurized fluid acting simultaneously on the secondary piston assembly to advance the secondary piston assembly in the second bore portion causing the second valve to close and the first valve to open thereby enabling fluid under pressure from the high pressure source to pass to the second slave cylinder.

Each slave cylinder may comprise a separate assembly comprising a cylinder bore in which works a piston acting on a control member.

Preferably both slave cylinders may be combined into a single assembly comprising a housing having a stepped bore in the portions of different diameter of which work a pair of aligned pistons of different diameters.

Conveniently the aligned pistons are combined into a single differential piston assembly provided with separate areas which are subjected to different pressures. The high pressure fluid from the first pressure space acts on one area of the piston assembly and the fluid from the high pressure source acts in the same direction on the other area of the piston. Preferably the forces applied to the control member by the slave cylinder are substantially equal and substantially one half of the force is applied from each of the first pressure spaces and the high pressure source. However, by altering the relative areas of the pistons and/or the relative applied pressures the contribution to the effort applied to the control member by each pressure fluid can be varied to suit any particular operating requirement.

Some embodiments of our invention are illustrated in the accompanying drawings in which:

FIG. 1 is a schematic layout of a system for operating a clutch lever showing the clutch in an engaged position;

FIG. 2 is a layout similar to FIG. 1 with the clutch disengaged and the source of hydraulic pressure operative;

FIG. 3 is a layout similar to FIG. 1 with the clutch disengaged and the source of high pressure fluid inoperative;

FIG. 4 is a longitudinal section through a valve for controlling the supply of fluid to the slave cylinders; and FIG. 5 is a longitudinal section through a slave cylinder assembly incorporating a differential piston working in a stepped bore.

In the layout illustrated in FIGS. 1 to 3 of the drawings, 1 is the body assembly of a master cylinder assembly which is provided with longitudinally extending bore 2 incorporating a portion 3 in which works a first piston assembly comprising piston 4 adapted to be moved axially in the bore by a pedal-operated rod 5. A radial port 6 provides communication with a hydrostatic reservoir for hydraulic fluid. In the inoperative position shown, in FIG. 1, a pressure space 7 in front of the piston 4 is in communication with the reservoir and the pressure space 7 is defined in the bore 2 between the piston 4 and a secondary piston assembly.

The secondary piston assembly comprises a differential piston 8 working in a stepped bore 9 in a common partition member 10 separating the bore portion 3 from the remainder of bore 11 with the portion of the piston of greater diameter being exposed to the pressure in the pressure space 7. The portion of the piston 8 of smaller diameter extends for a substantial distance into a longitudinally extending bore portion 11 and fixedly carries at an intermediate point in its length a piston or sleeve 12 which works in the bore portion 11 and which is of a diameter substantially greater than that of the portion of the piston 8 of greater diameter. The piston or sleeve 12 is positioned between a pair of spring loaded tipping valves 13 and 14 controlling respectively communication between the bore portion 11 and a source of high pressure fluid, for example an hydraulic accumulator or pump, and a reservoir for fluid supplying fluid to the high pressure source. Each tipping valve comprises a head 15 for engagement with a seating surrounding a connection to the reservoir of source, and a stem 16 carrying the head and projecting into the path of the piston or sleeve 12.

A slave cylinder assembly indicated at 17 comprises a body 18 provided with a longitudinally extending stepped bore 19 which is closed at one end and in the portion 20 of larger diameter terminating at its open end works a differential piston assembly including a piston part 21 for actuating a clutch lever through a rod 22, and a piston part 23 of smaller diameter works in the portion 24 of the bore of smaller diameter.

The pressure space 7 is connected through a connection 25 to the portion 20 of the bore between the piston parts 21 and 23 and the bore 11 is connected through a connection 26 to a space 27 between the piston 23 and the closed end of the stepped bore 19.

In the normal inoperative position shown in FIG. 1 the tipping valve 14 is held in an open position by the piston or sleeve 12 so that the bore 11 is in communication with the reservoir.

When the rod 5 is operated by the pedal, the piston 4 is advanced in the bore portion 3 to close communication with the reservoir through the port 6 and thereafter pressurize the fluid in the pressure space 7. The pressurized fluid acts on the piston 8 to advance it in the stepped bore 9 and move the piston or sleeve 12 forwardly. This allows the tipping valve 14 to close and a further additional movement of the piston or sleeve 12 opens the tipping valve 13 so that high pressure fluid enters the bore portion 11, and is transmitted to the portion 27 of the stepped bore in the slave cylinder 17, to act on the inner end of the piston 23. Simultaneously fluid from the pressure space 7 is delivered to the portion 20 of the bore 19 between the piston parts 21 and 23 and acts on the piston part 21 over the area of the piston part 21 minus the area of the adjacent end of the piston part 23.

The piston assembly comprising the piston parts 21 and 23 are advanced simultaneously to actuate the clutch lever through the rod 22 and assume the position shown in FIG. 2. Thus substantially one half of the force applied to the clutch lever is supplied from the pressure space 7 and the bore 11.

In the event of failure of the pressure source, pressurized fluid from the pressure space 11 is applied only to the piston part 21.

In a modification a clutch valve may be supplied with hydraulic fluid from the pressure space of a separate master cylinder with which the valve forms an assembly. A form of clutch valve is shown in detail in FIG. 4, and the same reference numerals have been applied to the same parts as those illustrated in FIGS. 1 to 3.

The control valve illustrated in FIG. 4 is identical with a part of the construction described above except that the piston 8 and the piston or sleeve 12 are combined into one assembly in the form of a differential piston 28 working in the bore portion 11 which is stepped. The differential piston 28 is normally held in a retracted position to hold the spring loaded tipping valve 14 open by means of a return compression spring 29 acting between the end of the portion 30 of larger diameter of the piston 28 and a plug 30 closing the outer end of the bore 11 and provided with an axial passage defining the connection 26 to the smaller piston of the slave cylinder 17. The smaller diameter portion 31 of the piston 30 is provided with a diametrical passage 32 leading into an axially extending passage 33 in the portion 30 of larger diameter to provide a return flow to the reservoir of hydraulic fluid from the bore 11 when the clutch is released.

The body of the clutch valve is provided with a radial port or passage 34 adapted to be connected to the pressure space in front of a piston of a pedal-operated master cylinder through an external connection (not shown). The operation of the assembly comprising the pedal-operated master cylinder and the clutch valve is otherwise the same as the construction described above with reference to FIGS. 1–3 and need not be described further herein.

The slave cylinder assembly is illustrated in detail in FIG. 5 and again reference numerals corresponding to those used in FIGS. 1 to 3 have been used to indicate corresponding parts.

As illustrated in FIG. 5 a piston assembly 35 comprises piston parts 21 and 23 formed integrally with each other and having annular portions 36 and 37 respectively working in the stepped bore 19. The annular portions 36 and 37 are separated by an annular land or recess 38. The piston assembly 35 is held in abutment with the rod 22 by a spring 39 acting between the end 40 of the piston part 21 of smaller diameter and the closed end of the bore 19.

When the differential piston assembly 35 is subjected to fluid under pressure from the first pressure space 7 of the master cylinder assembly and the pressure source, the pressure from the first pressure space 7 acts on the annular portion 36 of the piston 35 and the high pressure fluid acts on the annular portion 37.

We claim:

1. A master cylinder assembly for use in an hydraulic system comprising a cylinder body assembly, a positively actuated first piston movable axially in a first cylinder bore in said body assembly to pressurize fluid in a first pressure space in front of said first piston, a secondary piston movable axially in a second cylinder bore in said body assembly, movement in the forward direction resulting only from pressure fluid from the first pressure space, a portion of reduced diameter extending forwardly from said second piston into a second pressure space in a third cylinder bore, an abutment in said second cylinder bore for limiting movement of the secondary piston in the forward direction, a first outlet in a wall of the cylinder body assembly for connecting said first pressure space to a first hydraulic circuit, a second outlet in a wall of the cylinder body assembly for connecting said second pressure space to a second hydraulic circuit, a first valve for providing communication between a source of hydraulic fluid under pressure and said second pressure space, a second valve for providing communication between the said second pressure space and a reservoir for the source of hydraulic fluid under pressure, said first and second valves being axially spaced in the wall of the said second pressure space and being engageable by a member extending forwardly from the reduced diameter portion of said secondary piston, said first valve being normally closed and said second valve normally being held in an open position by the said member, but on movement of said secondary piston towards said first valve, said second valve closes before said first valve is opened, and a third normally open valve for providing communication between said first pressure space and a reservoir for hydraulic fluid, the arrangement being such that axial movement of said first positively actuated piston in said first bore closes said third valve and subjects said first pressure space to fluid under pressure which is supplied to said first outlet and which acts simultaneously on said second piston to advance said member to close said second valve and to open said first valve whereby fluid under pressure is supplied to said second outlet.

2. An hydraulic system comprising the master cylinder assembly of claim 1, in which said first outlet is connected to a first slave cylinder and said second outlet is connected to a second slave cylinder.

3. A master cylinder assembly as claimed in claim 1 wherein said cylinder body assembly comprises a single housing incorporating said first, second and third bores.

4. A master cylinder assembly as claimed in claim 1 wherein said cylinder body assembly comprises two separate housings each incorporating at least one of the bores, and said second pressure space defined by a part of said third bore in one housing is connected to said first bore in the other housing through an external connection.

5. An hydraulic system as claimed in claim 2, wherein said first and second slave cylinders are combined into a single assembly comprising a housing having a stepped bore in the portions of different diameter of which work a pair of aligned pistons of different diameters acting on a control member.

6. An hydraulic system as claimed in claim 5, wherein said pistons are combined into a single differential piston assembly working in said stepped bore and having first and second different areas, high pressure fluid from said first pressure space acting on said first area of said piston assembly and the fluid from said high pressure source acts in the same direction on said second area of the piston.

7. An hydraulic system as claimed in claim 2, wherein each slave cylinder is adapted to apply an equal force to a common control member.

8. An hydraulic system as claimed in claim 2 in which each slave cylinder comprises a piston working in a cylinder bore and the effective area of said pistons of said slave cylinders and the respective pressures supplied thereto from said first pressure space and said high pressure source are chosen so as to apply to a common control member predetermined forces.

9. An hydraulic system as claimed in claim 8, wherein said forces are equal.

10. An hydraulic system as claimed in claim 8 wherein said forces are different.

* * * * *